United States Patent
Filippi et al.

(10) Patent No.: US 10,619,612 B2
(45) Date of Patent: Apr. 14, 2020

(54) FUEL INJECTION VALVE AND FUEL-INJECTION SYSTEM

(71) Applicant: Continental Automotive GmbH, Hannover (DE)

(72) Inventors: Stefano Filippi, Castel' Anselmo Collesalvetti (IT); Mauro Grandi, Leghorn (IT); Francesco Lenzi, Leghorn (IT); Valerio Polidori, Leghorn (IT)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 3 days.

(21) Appl. No.: 15/513,623

(22) PCT Filed: Aug. 26, 2015

(86) PCT No.: PCT/EP2015/069490
§ 371 (c)(1),
(2) Date: Mar. 23, 2017

(87) PCT Pub. No.: WO2016/045893
PCT Pub. Date: Mar. 31, 2016

(65) Prior Publication Data
US 2017/0292486 A1 Oct. 12, 2017

(30) Foreign Application Priority Data
Sep. 23, 2014 (EP) .................................. 14185909

(51) Int. Cl.
*F02M 61/14* (2006.01)
*F16J 15/12* (2006.01)

(52) U.S. Cl.
CPC ............ *F02M 61/14* (2013.01); *F16J 15/122* (2013.01); *F02M 2200/09* (2013.01);
(Continued)

(58) Field of Classification Search
CPC .......... F02M 61/14; F02M 2200/9015; F02M 2200/851; F02M 2200/858; F02M 2200/09; F16J 15/122
See application file for complete search history.

(56) References Cited

U.S. PATENT DOCUMENTS 2,599,990 A * 6/1952 Hatebur ................ B24B 41/062
451/243
8,069,842 B2 12/2011 Kannan ......................... 123/470
(Continued)

FOREIGN PATENT DOCUMENTS

EP 2251541 B1 11/2011 ............. F02M 61/14
EP 2385242 A2 11/2011 ............. F02M 53/04
(Continued)

OTHER PUBLICATIONS

Extended European Search Report, Application No. 14185909.0, 10 pages, dated Feb. 25, 2015.
(Continued)

*Primary Examiner* — Xiao En Mo
(74) *Attorney, Agent, or Firm* — Slayden Grubert Beard PLLC

(57) ABSTRACT

The present disclosure relates to fuel injection systems. The teachings thereof may be embodied in an adjustment device for a fuel injection valve including a ring element to fit a recess of the cylinder head between a valve housing and the cylinder head to align the valve relative to the recess. The ring element may include a metallic coil spring and an elastomeric component surrounding and completely enveloping the metallic component.

9 Claims, 3 Drawing Sheets

(52) U.S. Cl.
CPC . *F02M 2200/851* (2013.01); *F02M 2200/858* (2013.01); *F02M 2200/9015* (2013.01)

(56) References Cited

U.S. PATENT DOCUMENTS

| | | | |
|---|---|---|---|
| 8,978,624 B2* | 3/2015 | Kamada | F02M 61/14 |
| | | | 123/470 |
| 2013/0167807 A1* | 7/2013 | Kamada | F02M 61/14 |
| | | | 123/470 |
| 2015/0069151 A1* | 3/2015 | Filippi | F02M 61/10 |
| | | | 239/584 |

FOREIGN PATENT DOCUMENTS

| | | | | |
|---|---|---|---|---|
| EP | 2599990 A1 | 6/2013 | | F02M 61/14 |
| EP | 2690278 B1 | 12/2015 | | F02M 61/14 |
| JP | 11210886 A | 8/1999 | | F02F 11/00 |
| JP | 2002257239 A | 9/2002 | | F02F 11/00 |
| JP | 2006071023 A | 3/2006 | | F02F 11/00 |
| JP | 2007247893 A | 9/2007 | | F16J 15/12 |
| JP | 2008128342 A | 6/2008 | | F02F 11/00 |
| JP | 2008255975 A | 10/2008 | | F02M 51/06 |
| JP | 2008256193 A | 10/2008 | | F16J 15/12 |
| JP | 2010106759 A | 5/2010 | | F02F 1/24 |
| WO | 2016/045893 A1 | 3/1916 | | F02M 61/14 |
| WO | 93/06390 A1 | 4/1993 | | F16J 15/12 |

OTHER PUBLICATIONS

International Search Report and Written Opinion, Application No. PCT/EP2015/069490, 12 pages, dated Nov. 4, 2015.
Chinese Office Action, Application No. 201580051516.1, 15 pages, dated May 29, 2019.

* cited by examiner

FUEL INJECTION VALVE AND FUEL-INJECTION SYSTEM

CROSS-REFERENCE TO RELATED APPLICATIONS

This application is a U.S. National Stage Application of International Application No. PCT/EP2015/069490 filed Aug. 26, 2015, which designates the United States of America, and claims priority to EP Application No. 14185909.0 filed Sep. 23, 2014, the contents of which are hereby incorporated by reference in their entirety.

TECHNICAL FIELD

The present disclosure relates to fuel injection systems. The teachings thereof may be embodied in an adjustment device for a fuel injection valve and a fuel-injection system.

BACKGROUND

Fuel injection valves are in wide spread use, e.g., in internal combustion engines. Valves may be dose fuel into an intake manifold of the internal combustion engine or directly into the combustion chamber of a cylinder of the internal combustion engine. The fuel injection valves can be coupled to the cylinder head of the internal combustion engine in different manners. The coupling of the fuel injection valves to the cylinder head should be very precise to obtain a correct injection point. It is known to use a spacer ring made of stainless steel for installing the fuel injection valve in the cylinder head.

SUMMARY

The teachings of the present disclosure may enable an improved adjustment device for adjusting a fuel injection valve to a cylinder head of a combustion engine. The teachings may be employed to facilitate a reliable and precise coupling between the fuel injection valve and the cylinder head of the combustion engine.

Some embodiments may include an adjustment device (20) for a fuel injection valve, the fuel injection valve being configured to be arranged in a cylinder head (14) of an internal combustion engine (12), the adjustment device (20) comprising a ring element (30) which is arrangeable in a recess (16) of the cylinder head (14) between a valve housing (24) of the fuel injection valve and the cylinder head (14) to align the fuel injection valve (10) relative to the recess (16), wherein the ring element (30) comprises two individual components, a metallic component (32) and an elastomeric component (34), the metallic component (32) comprises a coil spring, and the elastomeric component (34) surrounds the metallic component (32) in such fashion that it completely envelops the metallic component.

In some embodiments, the metallic component (32) further comprises a metal foil which envelops the coil spring, the metal foil is shaped as a tube in which the coil spring is arranged, and an outer surface of the metal foil represents an interface of the metallic component (32) to the elastomeric component (34).

In some embodiments, the elastomeric component (34) is insert molded around the metallic component (32).

In some embodiments, the elastomeric component (34) comprises a sheet of elastomeric material which is wrapped around the metallic component (32).

In some embodiments, the elastomeric component (34) surrounds the metallic component (32) in circumferential and radial direction with respect to a central axis of the ring element (30).

In some embodiments, the elastomeric component (34) has a hollow, toroidal basic shape.

In some embodiments, the turns of the coil spring are wound around a center line, the center line having a circular basic shape.

Some embodiments include a fuel-injection system with an adjustment device (20) as described above, the cylinder head (14) of the internal combustion engine (12) and the fuel injection valve (10) with the valve housing (24), wherein the fuel injection valve (10) and the adjustment device are arranged in the recess (16) of the cylinder head (14).

In some embodiments, the elastomeric component (34) of the ring element (30) abuts the valve housing (24) and a surface of the recess (16) of the cylinder head (14) and the metallic component (32) is spaced apart from the valve housing (24) and the surface of the recess (16).

BRIEF DESCRIPTION OF THE DRAWINGS

Exemplary embodiments of the invention are explained in the following with the aid of schematic drawings. These are as follows.

Elements of the same design and function that occur in different illustrations are identified by the same reference character.

DETAILED DESCRIPTION

Figure 1:
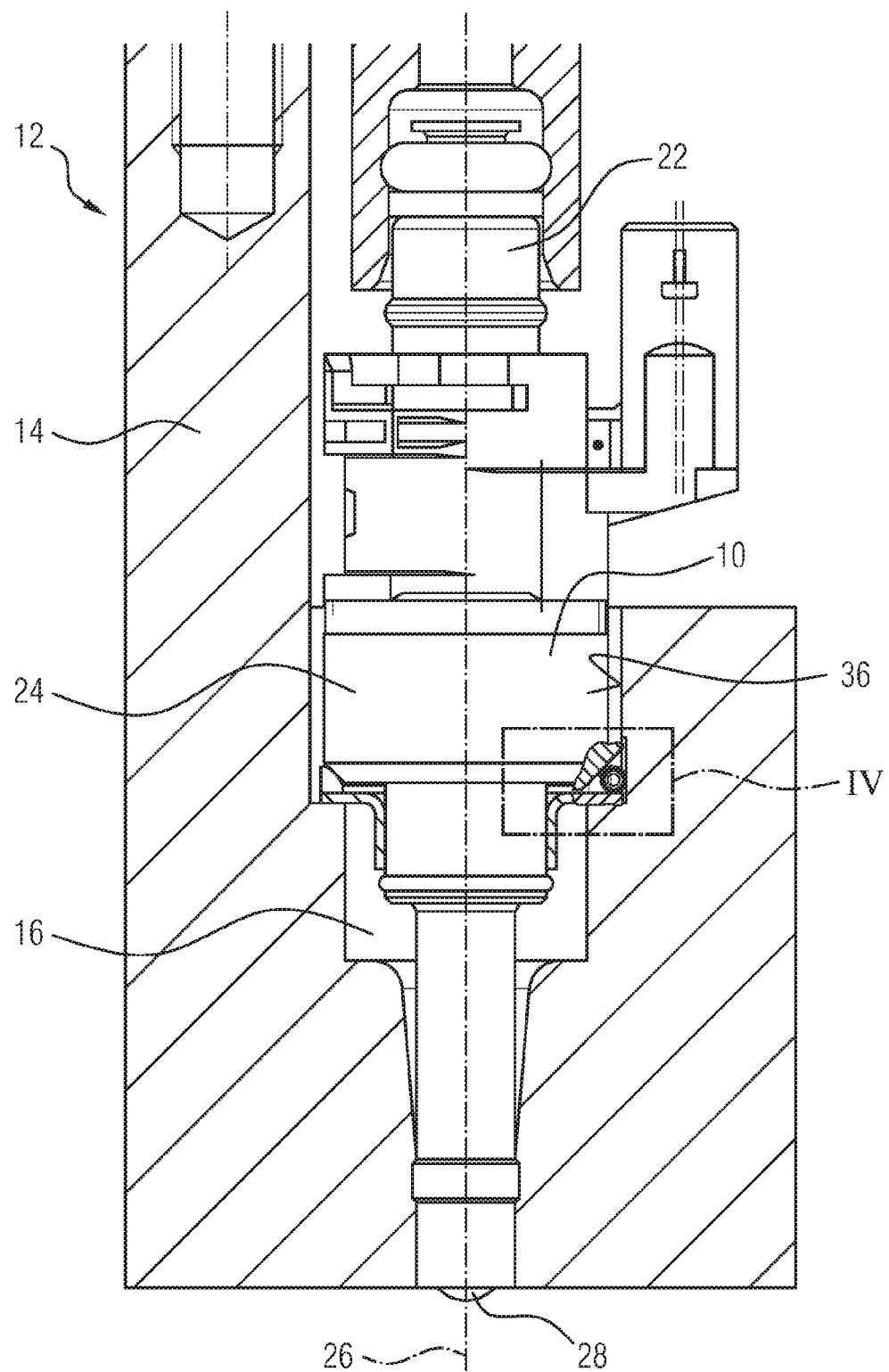
FIG. 1 a fuel injection system according to the teachings of the present disclosure in a schematic section view, FIG. 2 a detail of the fuel injection system of FIG. 1, FIG. 3 detail IV of FIG. 1, and FIG. 4 a perspective view of an adjustment device according to teachings of the present disclosure.

In some embodiments, fuel injection valve has a valve housing with a longitudinal axis. In some embodiments, the fuel injection valve comprises an adjustment device. For example, the adjustment device surrounds a portion of the valve housing and the fuel injection valve is shaped to limit the displacability of the adjustment element relative to the valve housing.

Some embodiments include a fuel injection system comprising the cylinder head, the adjustment device, and the fuel injection valve. The fuel injection valve may be arranged in a recess of the cylinder head.

In some embodiments, the adjustment device comprises a ring element. The ring element is arrangeable in a recess of the cylinder head between the valve housing and the cylinder head to align the fuel injection valve relative to the recess. In some embodiments, the ring element abuts the injector body and the cylinder head.

In some embodiments, the ring element includes a central opening which extends through the ring element in direction of a central axis of the ring element. The central axis may be parallel or coaxial to the longitudinal axis of the valve housing. The valve housing may extend through the central opening.

In some embodiments, the ring element comprises two components, a metallic component and an elastomeric component. The metallic component may include one or more metallic materials, such as metals and/or alloys. The elastomeric component may include an elastomeric material such as a rubber.

Different tasks may be performed by one ring element having different components for each task. Therefore every task may be solved effectively. Therefore, the number of components for the fuel injection valve may be kept small. Consequently, a low cost solution for the fuel injection valve may be obtained. Furthermore, an easy and fast assembly and disassembly of the fuel injection valve is possible.

The metallic component may provide the ring element with adequate stiffness for precisely positioning the injection valve to ensure the desired injection. The elastomeric component may dampen vibrations between the fuel injection valve and the cylinder head to reduce noise. In some embodiments, the elastomeric component provides a viscoelastic damping of the vibrations. Because the the elastomer absorbs shocks and vibrations, the noise level due to relative movements of the fuel injection valve and the cylinder head may be reduced.

Furthermore, the ring element may have reduced adhesion to the cylinder head. Consequently, simple service operations are possible. In some embodiments, the ring element and its elastomeric component may be shaped and configured to seal a gap between the valve housing of the fuel injection valve and the recess of the cylinder head against dust ingression into the cylinder through the recess. By means of the elastomeric component a good contact between the ring element and the cylinder head and between the ring element and the fuel injection valve is achievable so that the sealing is particularly reliable.

In some embodiments, the elastomeric component surrounds the metallic component. This arrangement of the components enables a space saving and easy fuel injection valve installation. In some embodiments, the elastomeric component surrounds the metallic component totally in circumferential and radial direction, in particular with respect to the central axis. With other words, the elastomeric component coats or envelops the metallic component completely. That may provide the advantage and characteristics of both materials, also called the properties of the materials. The combination may provide that one component influences the other component to a wider functionality range. For example, the elastic functionality of the metallic component in one or two dimensions may be combined with a ductility of the elastomeric component which may reach the third dimension in addition.

In some embodiments, the elastomeric component has a hollow toroidal basic shape and envelops the metallic component. The toroidal basic shape may the central opening of the ring element. The elastomeric component may envelop the metallic component. Thus, the metallic component may be spaced apart from the valve housing and from the cylinder head.

In the present context, a "toroidal basic shape" is not restricted to a body of revolution having a circular cross-sectional outer contour. It is rather a body of revolution resulting from rotating a base around the central axis. The base is a surface which is spaced apart (not overlapping) the central axis, is parallel to the central axis. It has an outer contour and an inner contour fully enclosed by the outer contour and extends between the outer and inner contours. The base represents a cross-section of the toroidal basic shape. The elastomeric material is arranged between the outer and inner contour. By means of the inner contour, a cavity is shaped in the toroidal basic shape so that it is hollow. The metallic component may expediently be arranged in the cavity.

In some embodiments, a particularly good seal is achievable in this way. The metallic component may provide a particularly good mechanical support for the elastomeric component.

In some embodiments, the metallic component comprises a spring. Due to the elasticity of the spring a particularly good centering and tolerance recovery are achievable.

In some embodiments, the metallic component is a coil spring. The coil spring may comprise stainless steel, e.g., a spring steel. In some embodiments, the coil spring has an imaginary center line around which the turns of the coil spring are wound. The center line may have a circular basic shape. In particular, the center line extends around the central axis of the ring element, in particular in a plane perpendicular to the central axis. In some embodiments, the center line extends completely within the cavity of the hollow toroidal basic shape of the elastomeric compound. Each turn of the coil spring may act individually to recover irregularities in axial and radial direction, for example by changing the inclination relative to the central axis, by radial displacement, by axial and/or radial compression, or the like.

In some embodiments, the ring element may be positioned engaging the valve housing between the valve housing and a surface of the cylinder head. The surface of the cylinder head and/or the valve housing may have irregularities due to manufacturing tolerances. Every turn may balance or adjust irregularities so that a particularly tight seal can be established by means of the elastomeric compound.

In some embodiments, the metallic component comprises a metal foil which envelops the coil spring. The metal foil may have a toroidal basic shape, shaped as a tube in which the coil spring is arranged. In some embodiments, an outer surface of the metal foil represents an interface of the metallic component to the elastomeric component. The metal foil may be plastically deformable. The metal foil can comprise or consist of copper. By means of the metal foil, in particular by means of its plastic deformability, a particularly good contact between the ring element and each of the fuel injection valve and the cylinder head is achievable.

In some embodiments, the elastomeric component comprises a sheet of elastomeric material which is wrapped around the metallic component. Alternatively, the metallic component can be coated by the elastomeric component via insert molding. Insert molding is an economical method for covering metallic objects. In this way, production of the adjustment device may be particularly cost effective. Further, a tight and/or symmetric covering of a coil spring is easily achievable in this way.

Figure 2:
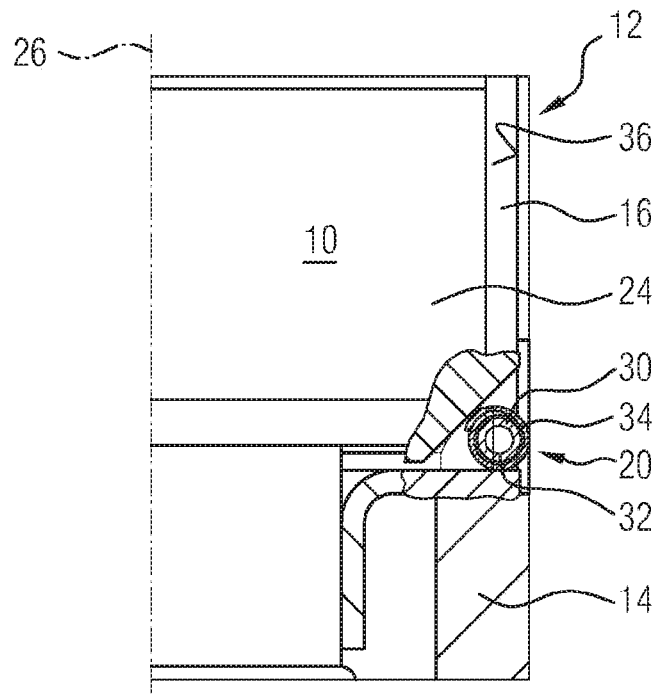

FIG. 1 shows a schematic section view of a fuel injection system according to the teachings of the present disclosure. FIG. 2 shows a portion of the fuel injection system in more detail.

The fuel injection system comprises a fuel injection valve 10 arranged in a cylinder head 14 of an internal combustion engine 12 and an adjustment device 20. The cylinder head 14 comprises a recess 16 in which the fuel injection valve 10 is received. The fuel injection valve 10 is at least partially in engagement with the recess 16 via the adjustment device 20. The adjustment device 20 is arranged in the recess 16 and enables the adjustment of the fuel injection valve 10 relative to the cylinder head 14 of the combustion engine 12.

The fuel injection valve 10 has an injector coupling portion 22.

The injector coupling portion 22 may be coupled to a high-pressure fuel chamber of a fuel rail where the fuel is stored under high pressure, for example, under the pressure of up to 500 bar in the case of a gasoline engine.

The fuel injection valve 10 comprises a valve housing 24 with a central longitudinal axis 26 and a cavity which is axially led through the valve housing 24 (not visible in the figures). The fuel injection valve 10 further comprises a valve needle taken in the cavity of the valve housing 24 (not visible in the figures). At an outlet end of the fuel injection valve 10, an injection nozzle 28 is formed which is closed or opened by an axial movement of the valve needle.

In a closing position of the valve needle, fuel flow through the injection nozzle 28 is prevented. In an opening position, fuel can flow through the injection nozzle 28 into a not shown combustion chamber of the internal combustion engine 12.

Figure 3:
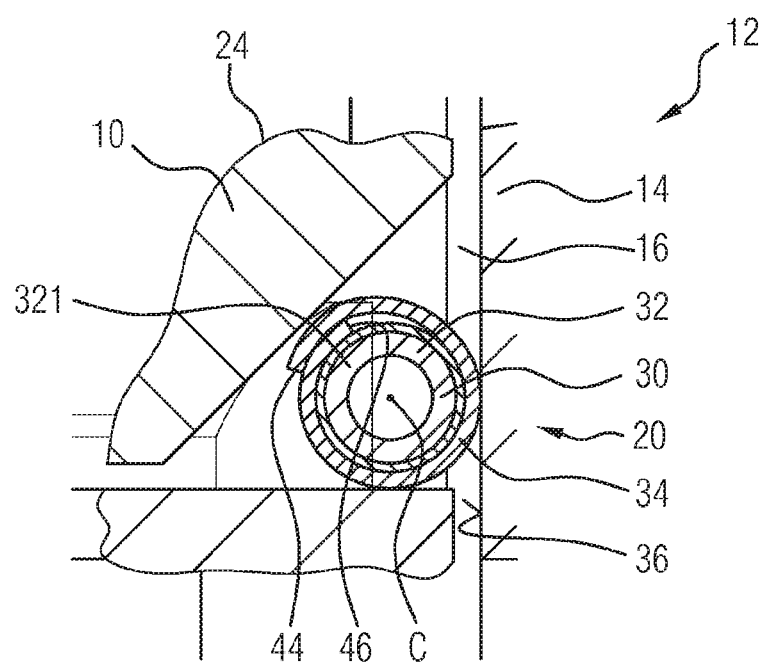

The adjustment device 20 comprises a ring element 30 which is shown in more detail in the detail IV (cf. FIG. 1) of FIG. 3. The ring element 30 is arranged in the recess 16 of the cylinder head 14 between the valve housing 24 and the cylinder head 14. One function of the ring element 30 is the function of a washer. In particular, it abuts the valve housing 24 and also abuts a surface of the recess 16 of the cylinder head 14. The ring element 30 has a central axis which is coaxial with the longitudinal axis 26 of the valve housing 24. The valve housing 24 extends in axial direction through a central opening of the ring element 30.

The ring element 30 consists of two components 32, 34, a metallic component 32 and an elastomeric component 34. The metallic component 32 comprises a coil spring 321 made of a metal or an alloy. The coil spring 321 extends in the interior of a tubular metal foil 322 of the metallic component 32. The metal foil 322 is may comprise a copper foil. In a variant of the adjustment device, the metal foil 322 can be omitted.

The elastomeric component comprises an elastomer. The elastomeric component 34 is coating the metallic component 32. The metal foil 322 has an interface with the elastomeric component 34 at its outer surface remote from the coil spring 321.

The two ends of the coil spring 32 may be fixed to each other so that the coil spring is formed like a closed circle. In other words, the turns of the coil spring are wound around an imaginary center line C which runs around the longitudinal axis 26 in a radial plane, e.g., in a plane perpendicular to the longitudinal axis 26.

The elastomeric component 34 may comprise a jacket of the ring-shaped metallic component 32. The metallic component 32 wears the elastomeric component 34, which may be manufactured from rubber, as an envelope so that the elastomeric component 34 defines the central opening of the ring element 30. To put it differently, the metallic component 32, in some embodiments of the adjustment device 20, represents a core of the ring element 30 and the elastomeric component 34 represents a shell of the ring element 30, the shell surrounding the core and comprising the external surface of the ring element 30.

The construction of the adjustment device 20 with the ring element 30 having two components 32, 34 allows an exact alignment of the fuel injection valve 10 relative to the cylinder head 14. Consequently, the injection process in the combustion chamber of the internal combustion engine 22 may be carried out with a high precision in particular in view of the injection angle and the position of the injection point.

The elastomeric component 34 may have a greater ductility than the valve housing 24 and the cylinder head 14, which may act as flange.

Further the elastomeric component 34 has a greater ductility than an elastic core of the ring element 30, the coil spring 32. During compression the resulting specific pressure squeezes the jacket 34 and fills the flange imperfections while insuring contact with the flange sealing faces. The combination of elasticity and stiffness of the coil spring 321, plasticity of the metal foil 322 and viscoelasticity of the elastomeric component 34 allows setting a stable tip position, avoiding dust contamination of the tip and the combustion chamber by creating a reliable seal and reducing the noise because of the dampening properties of the elastomer.

Because of the elastomeric component 34, only minimum sticking between the ring element 30 and the cylinder head 14 during the lifetime of the fuel injection valve 10 may be obtained. Therefore, it is possible that the necessary services as for example a disassembling of the fuel injection valve 10 from the cylinder head 14 may be carried out very simply. Furthermore, elastomers may have a good ability to absorb shocks and vibrations. Therefore, ring elements 30 comprising elastomers may achieve a low noise emission in a contact zone between the fuel injection valve 10 and the cylinder head 14.

The coil spring 321 may comprise a stainless steel, in particular of spring steel. This makes it possible that the ring element 30 has a high stiffness. Thus, a high mechanical stability of the ring element 30 may be obtained. Therefore it is possible to maintain the position of the injection valve 10 during a long time and during changing temperatures. At the same time, tolerances of the cylinder head 14 and of the valve housing 24 may be recovered by the ring element 30, because each turn of the metallic component 32 can be moved or stressed basically independent from other turns.

Tolerances and/or misalignment during assembling may be recovered may, thus, be recovered particularly efficiently.

In some embodiments, the elastomeric component 34 comprises a sheet of a rubber which is wrapped around the metallic component 32, specifically around the metal foil 322 along the center line C. A first circumferential end 44 and a second circumferential end 46 overlap along the course of the center line C in directions perpendicular to the center line (see in particular FIG. 3). The first and second circumferential ends 44, 46 are fixed to one another so that the rubber sheet is formed into a tubular ring-shape. In other words, the elastomeric component 34 represented by the rubber sheet enveloping the metallic component 32 has a hollow toroidal basic shape. The toroidal basic shape has the same center line C as the coil spring 321. The metallic component 32 with the coil spring 321 and the metal foil 322 is positioned in the cavity formed by the tubular ring-shaped rubber sheet.

Figure 4:
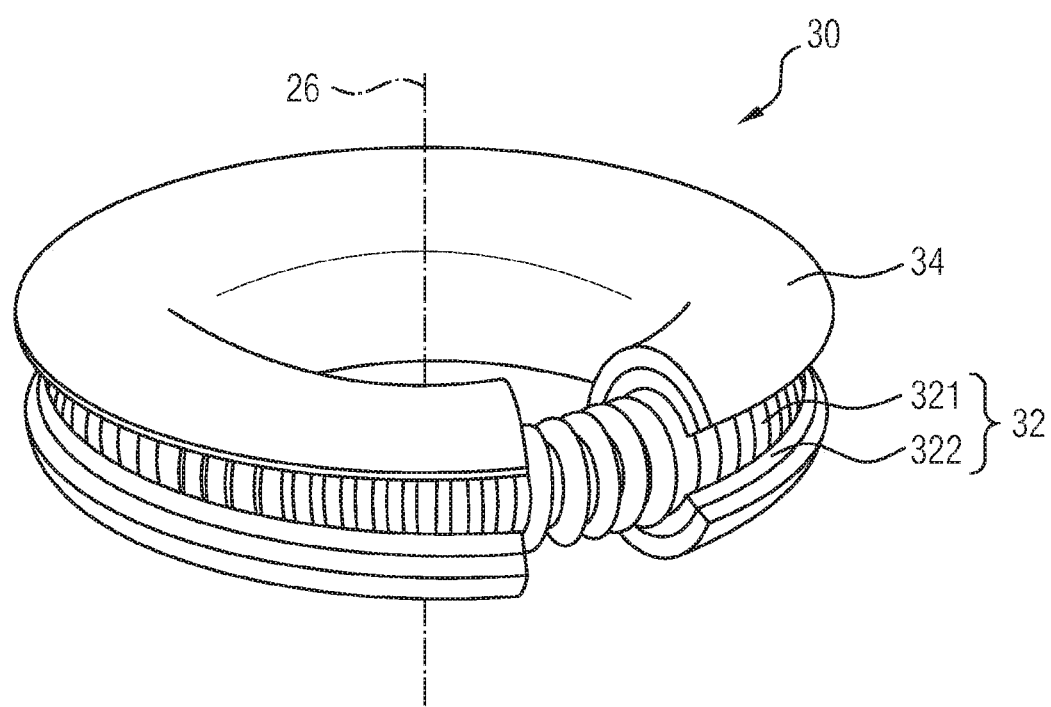

FIG. 4 shows another embodiment of the adjustment device 20 which is also usable for the fuel injection system of the preceding embodiment. The adjustment device 20 is represented by the ring element 30 shown in a perspective view in FIG. 4.

In some embodiments, the elastomeric component 34 of the ring element 30 is insert-molded around the metallic component 32. The metallic component 32 in the cavity of the hollow elastomeric component 34 corresponds to that described above in connection with FIGS. 1 to 3.

In the representation of FIG. 4, portions of the tubular metal foil 322 and of the insert-molded elastomer tube representing the elastomeric component 34 are omitted to make the coil spring 321 visible. However, the metal foil 322 and the elastomeric component each have a hollow toroidal basic shape which completely envelops the coil spring 321 at all places in circumferential direction around the central axis 26 and on the side facing away from the central axis 26.

What is claimed is:

1. An adjustment device for a fuel injection valve configured to mate to a cylinder head of an internal combustion engine, the adjustment device comprising:
    a ring element sized to fit a stepped recess in the cylinder head between a valve housing of the fuel injection valve and the cylinder head, to align the fuel injection valve relative to the cylinder head;
    the ring element extending around a central axis and comprising a metallic component and an elastomeric component;
    wherein the metallic component comprises a ring-shaped coil spring, the ring-shaped coil spring having turns wound around a ring-shaped centerline having a circumference extending around the central axis of the ring element;
    a metal foil comprising a tube enveloping the coil spring between the coil spring and the elastomeric component; and
    the elastomeric component has a closed, hollow toroidal shape that completely envelops the metallic component at all places along the circumference of the ring-shaped coil spring, wherein a cross-section of the elastomeric component in a plane perpendicular to the centerline of the coil spring defines a circular or round outer surface extending around the centerline of the coil spring.

2. The adjustment device according to claim 1, wherein:
    an outer surface of the metal foil comprises an interface of the metallic component to the elastomeric component.

3. The adjustment device according to claim 1, further comprising the elastomeric component insert molded around the metallic component.

4. The adjustment device according to claim 1, wherein the elastomeric component comprises a sheet of elastomeric material wrapped around the metallic component.

5. The adjustment device according to claim 1, wherein the elastomeric component surrounds the metallic component in both a circumferential and a radial direction with respect to a central axis of the ring element.

6. An adjustment device according to claim 1, wherein the elastomeric component has a hollow, toroidal basic shape.

7. An adjustment device according to claim 1, wherein the turns of the coil spring are wound around a center line having a circular basic shape.

8. A fuel-injection system comprising:
    a cylinder head including a cylinder head step and defining including a stepped recess for mounting a fuel injection valve, the cylinder head step defined by (a) a first longitudinally-extending inner surface defining a first recess portion of the stepped recess having a first diameter, (b) a second longitudinally-extending inner surface defining a second recess portion of the stepped recess having a second diameter smaller than the first diameter of the first recess portion, and (c) a valve seat surface extending radially between the first inner surface and second inner surface of the cylinder head;
    a ring element configured to sit on the valve seat surface;
    a fuel injection valve with a valve housing; and
    wherein the fuel injection valve compresses the ring element between (a) a lower surface of sized to fit the stepped recess between the valve housing of the fuel injection valve, (b) the valve seat surface of the cylinder head, and (c) the first longitudinally-extending inner surface of the cylinder head to align the fuel injection valve relative to the cylinder head;
    the ring element comprising a metallic component and an elastomeric component;
    wherein the metallic component comprises a coil spring;
    the elastomeric component surrounds the metallic component to completely envelop the metallic component; and
    the elastomeric component of the ring element abuts the valve housing and a surface of the stepped recess of the cylinder head.

9. The fuel-injection system according to claim 8, wherein:
    the metallic component is spaced apart from the valve housing and the surface of the recess.

* * * * *